United States Patent [19]

Berrod

[11] Patent Number: 4,915,174

[45] Date of Patent: Apr. 10, 1990

[54] CONCENTRATED SUSPENSIONS OF WATER SOLUBLE POLYMERS

[75] Inventor: Gerard Berrod, Villeurbanne, France

[73] Assignee: Rhone-Poulenc Specialites Chimiques, Courbevoie, France

[21] Appl. No.: 298,313

[22] Filed: Jan. 17, 1989

Related U.S. Application Data

[63] Continuation of Ser. No. 576,759, Feb. 3, 1984, abandoned.

[30] Foreign Application Priority Data

Feb. 14, 1983 [FR] France ................................. 83 02289

[51] Int. Cl.$^4$ .......................... C09K 7/00; E21B 43/16
[52] U.S. Cl. ................................. 166/305.1; 166/275; 252/8.515; 252/8.554; 523/130; 524/801
[58] Field of Search ..................... 166/274, 275, 305.1; 523/130; 524/55, 801; 252/8.515, 8.554

[56] References Cited

U.S. PATENT DOCUMENTS

| | | | |
|---|---|---|---|
| 2,552,775 | 5/1951 | Fischer | 252/8.5 A |
| 3,839,263 | 10/1974 | Eilers | 523/130 |
| 3,849,361 | 11/1974 | Zweigle | 524/376 |
| 3,850,244 | 11/1974 | Rhudy | 166/274 |
| 3,880,764 | 4/1975 | Donham | 252/8.5 A |
| 3,919,092 | 11/1975 | Norton | 166/274 |
| 4,143,007 | 3/1979 | DeMartino | 524/55 |
| 4,217,958 | 8/1980 | Doster | 166/275 |
| 4,265,673 | 5/1981 | Pace | 524/55 |
| 4,299,710 | 11/1981 | Dupre et al. | 252/8.5 A |
| 4,393,151 | 7/1983 | Dawans et al. | 523/130 |
| 4,454,260 | 6/1984 | Dawans | 252/8.55 D |

*Primary Examiner*—Theodore Morris
*Attorney, Agent, or Firm*—Burns, Doane, Swecker & Mathis

[57] ABSTRACT

The invention provides concentrated suspensions of high molecular weight water soluble polymers comprising a high molecular weight water soluble polymer, a nonpolymer solvating organic diluent, a swelling agent and a low molecular weight polymer adjuvant, soluble in water and having functional carboxylic acid (or salt) groups thereon and methods for preparing same and the use thereof in the preparation of dilute aqueous thickening solutions suitable for use in various industrial applications, including the petroleum industry and, in particular, the secondary recovery of petroleum from underground well deposits in oil fields.

18 Claims, No Drawings

CONCENTRATED SUSPENSIONS OF WATER SOLUBLE POLYMERS

This application is a continuation of application Ser. No. 576,759, filed Feb. 3, 1984 now abandoned.

BACKGROUND OF THE INVENTION

The present invention relates generally to concentrated suspensions of polymers soluble in water, the preparation thereof and their use for the thickening of aqueous media.

Synthetic or natural organic polymers soluble or dispersable in water and which by solubilization or dispersion in water exhibit thickening and flocculating properties are widely used in industry in various fields of final application, such as in construction, paints, paper, textiles, cosmetics, the food industry, the treatment of waters, phytosanitation, mining, the assisted or secondary recovery of petroleum, etc.

For numerous applications, the polymers or hydrocolloids must first be prepared in the form of only slightly concentrated aqueous solutions or dispersions. It is known that the principal disadvantage of most of the powders of water soluble polymers is the difficulty of dissolving same rapidly without employing high shear agitation. Under the effects of excessively rapid hydration, the particles of the polymer in contact with water swell and tend to form clots or adhered masses resulting from the agglomeration of the particles. These clots, surrounded by a gelled thin film at the surface, are difficult to decompose and dissolve. The shear forces to which the polymer gels are exposed during their conversion to dilute aqueous solutions may cause the deterioration of certain of their advantageous properties.

To facilitate the dissolution of water soluble polymers of the polyacrylamide type, water-in-oil emulsions have been proposed which are prepared by the polymerization of the monomers in an emulsion and the resultant emulsion is inverted by the addition of water containing a surface active agent. However, these emulsions have very low stability, and tend to separate into two phases during storage.

Suspensions with a relatively higher concentration of polymers have also been proposed. Formulations of this type are described in U.S. Pat. Nos. 3,763,071 and 3,894,879.

However, these more concentrated suspensions are nevertheless not completely suitable for transportation, storage, metered pumping, etc. as a consequence of their attendant disadvantages resulting from deterioration, destabilization or sedimentation of the suspended polymers.

SUMMARY OF THE INVENTION

It is, therefore, a primary object of the invention to provide compositions based on water soluble polymers in the form of concentrated suspensions, which are stable in storage.

Another object is to provide suspensions that may be pumped and easily utilized in industrial installations, thereby obviating problems associated with the agglomeration of powders under the effects of humidity allowing for the direct use of such suspensions without the necessity of providing expensive facilities at industrial sites for the dissolution and suspension of the polymers.

A further object of the invention is to increase the dispersability of hydrophilic polymers in an aqueous medium and to reduce the tendency of polymer particles to agglomerate in contact with water.

A still further object of the invention is to provide suspensions or gels of hydrophilic polymers which, by dilution in an aqueous medium, yield easily filterable solutions without clogging and/or loss of viscosity.

DETAILED DESCRIPTION OF THE INVENTION

These and other objects and advantages are accomplished according to the present invention, wherein suspensions are provided comprising a particulate water soluble polymer, a liquid organic diluent which is not polymer solvating, a liquid swelling agent and a homo- or copolymer soluble in water, of a low molecular weight, and having carboxylic acid (or salt) functional groups thereon.

The term "water soluble polymers", unless otherwise stated, as used herein is intended to mean all high molecular weight polymers capable of solvation or dispersion in an aqueous system, and which, by solvation or dispersion, acquire advantageous swelling or flocculating properties. Such water soluble polymers include synthetic polymer, natural gums, modified natural gums and mixtures thereof.

A wide variety of water soluble synthetic polymers have been described in the literature. Reference may be made, for example, to "Water Soluble Resins" by Davidson and Sitting, Reinhold Publishers, 1968. Included within this class of polymers are preferred polymers and copolymers of high molecular weight polyacrylamide and polymethacrylamide types exemplified as follows:

—acrylamide homopolymers; anionic copolymers derived from a salt of acrylic acid and acrylamide; cationic polymers of acrylamide and a cationic monomer, such as trimethylammoniumethylmethacrylate chloride; cationic homopolymers derived from cationic monomers; and anionic polymers of acrylic acid and their salts.

The foregoing homo- and copolymers may be prepared by the processes described, for example, in French Pat. Nos. 2,348,227, 2,428,054 and 2,453,185.

Natural water soluble polymers are similarly described in the literature. [See *Industrial Gums*, Whistler, 2nd edition, Academic Press, 1973]. Variable natural water soluble polymers useful in the present invention include, for instance, natural gums of the family of the galactomannanes, such as guar, carob and Tara gum, gum arabic, algine (sodium alginate); modified natural gums such as cellulose derivatives, for example carboxymethylcellulose, the alkyl and hydroxyalkylcelluloses, carboxymethylhydroxyethyl cellulose; starch derivatives obtained by substituting a portion of the available hydroxide groups with acetate, hydroxyethyl, hydroxypropyl, sulfate, phosphate groups and the like. This category of natural polymers further includes polysaccharides of microbial origin, such as Xanthan gums.

The organic liquid diluent which functions as the suspending vehicle in the suspensions of the present invention may be selected from liquids miscible or nonmiscible with water provided that same are inert and do not solvate the particulate water soluble polymers utilized. It is apparent that the choice of a particular diluent depends on the exact nature of the polymer and the specific intended ultimate application of the suspension. As nonlimiting examples of the diluents, the following may be mentioned: aliphatic or aromatic hydrocarbons, halogenated hydrocarbons, kerosene, gas oil, lower aliphatic, cycloaliphatic and aromatic ketones and alcohols.

Among the diluents, presently preferred are those comprising $C_1$–$C_6$ aliphatic alcohols and particularly isopropanol, together with benzyl alcohol.

A mixture of diluents may, of course, also be used.

Agents giving rise to a swelling effect on the particulate water soluble polymers may consist of water and/or a polar organic liquid miscible with water. As nonlimiting examples of such swelling agents, included, for example, are: formamide, acetamide, dimethylformamide, ethylenediamine, glycols, such as ethylene glycol and propylene glycol, glycerol and mixtures of these different agents. In general, the swelling agent is used in the suspensions of the present invention in a polymer/swelling agent ratio between about 4.5/1 and 0.1/1, preferably about 2/1 and 0.2/1.

In addition to the swelling agent and the diluent, it is necessary to add to the composition an adjuvant promoting the inhibition of gelling and mass setting of the suspension. The adjuvants added in accordance with the present invention make it possible to further increase the concentration of the particulate polymer in the suspension. Preferred as adjuvants are low molecular weight homo- or copolymers soluble in water and having thereon functional carboxylic acid or salts thereof. These polymers may be readily obtained by the polymerization of an unsaturated α, β-carboxylic acid of the formula:

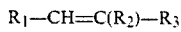

$R_1$—CH=C($R_2$)—$R_3$ wherein $R_1$ may be H, $CH_3$ or COOH, $R_2$ may be H, a lower alkyl i.e. 1 to 6 carbon atoms, halogen, COOH, $CH_2COOH$ and $R_3$ is COOH. The acid function or functions may themselves be in the form of their water soluble salts, such as alkali metal, alkaline earth metal, ammonium salts or amine salts formed with water soluble amines. Examples of such salts include β hydroxytrimethylammonium, benzyltrimethylammonium, monomethylammonium, dimethylammonium, trimethylammonium, triethylammonium, etc.

Examples of acids that may be used are acrylic, methacrylic, crotonic, itaconic, maleic, fumaric, methylene malonic acids, their mixtures and/or their salts.

Monomers that may be copolymerized with the unsaturated α, β-carboxylic acids include olefins, unsaturated esters and nitriles, vinyl ethers and esters and their mixtures. Nonlimiting examples of advantageous comonomers are ethylene, styrene, acrylonitrile, methacrylonitrile, acrylic and methacrylic esters derived from alcohols preferably having 1 to 4 carbon atoms, such as methyl(meth)acrylate, ethyl(meth)acrylate, n-butyl(meth)acrylate, t-butyl(meth)acrylate, alkylvinyl ethers preferably with 1 to 4 carbon atoms in the alkyl group, such as methylvinyl ether, ethylvinyl ether, n-butylvinyl ether, isobutylvinyl ether, optionally partially saponified vinyl esters of acids having 1 to 20 carbon atoms, in particular, vinyl acetate and the like.

Examples of preferred polymer adjuvants are the homopolymers of acrylic acid, the copolymers of acrylic and methacrylic acids, very low molecular weight maleic acid homopolymers, and their corresponding alkaline salts, copolymers of acrylonitrile and acrylic acid, acrylate-acrylic acid copolymers, etc.

The concentration of the comonomers in the mixture of monomers should be such that the resulting copolymer is soluble in water. The quantity of the conomomer may vary as a function of its hydrophobic character, up to 95% by weight of the mixture of monomers. Depending on the nature of the monomers and the polymerization system used, the molecular weight of the polymers will generally range between about 2,000 and 100,000, preferably between 5,000 and 50,000.

The suspensions according to the invention contain approximately 10 to 60% by weight of the water soluble polymer. The relative proportions of the polymer, the diluent, the swelling agent and the low molecular weight polymer adjuvant are determined as a function of the nature of the different compounds and the particle size distribution of the water soluble polymer and the particular properties of the suspension desired. It has been found that the stable and pumpable (flowable) suspensions are obtained with compositions containing, expressed by weight, 10 to 60% particulate water soluble polymer, 10 to 45% diluent, 10 to 75% swelling agent and 1 to 15% of the low molecular weight polymer adjuvant. Advantageously, the compositions may preferably contain 20 to 50% of the water soluble polymer, 20 to 35% of the diluent, 20 to 40% of the swelling agent and 2 to 10% of the low molecular weight polymer adjuvant.

Preparation of the suspensions is effectuated by mixing the components under agitation for several minutes. It is preferable to add the particulate water soluble polymer to a mixture of the low molecular weight polymer—the swelling agent—and the diluent.

Alternatively, the particulate polymer may be distributed in the diluent containing the low molecular weight polymer, possibly in the form of a concentrated aqueous solution, and then the swelling agent added in the amount necessary to obtain the desired suspension.

It is further possible to add to the composition a mineral or organic substance with a fine particle size distribution, soluble in water and insoluble in the diluent, which allows the polymer to be maintained in suspension in the medium without affecting the dispersability of the suspension. As nonlimiting examples of such substances, the following may be mentioned: saccharose, salts of mineral acids, such as sodium chloride or potassium chloride, and the like.

The suspensions prepared according to the invention remain stable in storage and may be dispersed and/or diluted in a simple and rapid manner in automatic or semiautomatic industrial appliances. They do not contain additives which would appreciably modify the rheology or viscosity of the hydrophilic polymer or harm the filterability of the dilute aqueous solution. As a consequence, they are particularly appropriate for use in oil-bearing fields and especially in the preparation of aqueous solutions intended for the assisted recovery of petroleum from undergound deposits.

The following nonlimiting examples will further illustrate the invention. In all of the examples, the manner of preparing the suspension is the following:

Into a vessel equipped with agitation means, the low molecular weight polymer additive (adjuvant) and the swelling agent are introduced. The diluent is added, followed by the water soluble polymer in powder form under agitation (1,000 rpm). The agitation is continued for 10 min. at a reduced speed (300 rpm).

The suspension is allowed to stand for 16 hours prior to determining the following measurements:

Viscosity: Brookfield, equipped with a UL adaptor.

Flow test at a constant rate: this test determines the absence of clogging of the porous medium after the passage of the aqueous polymer solution through same.

It consists of passing the dilute aqueous solution at a constant rate through a series of two calibrated porous filters. The variation in the loss of pressure $\Delta p_1$ and $\Delta p_2$ on either side of the filter as a function of time, is recorded. Low $\Delta p$ values indicate the absence of clogging.

EXAMPLE 1

As the water soluble polymer, a copolymer of acrylic acid and acrylamide (Petrogil AD 27) is used having the following properties:

| | |
|---|---|
| Molecular weight: | $3.5 \times 10^6$ |
| Particle size distribution: | more than 500 μm 15% |
| | 500–200 μm 30% |
| | less than 200 μm 55% |
| Viscosity of the 0.1% aqueous solution (5 g/l NaCl) | 15.7 m.Pa.s |

The composition of the suspension is as follows:

| | |
|---|---|
| Petrogil AD 27 | 35.5 g |
| Isopropanol | 26.5 g |
| Water | 31 g |
| Polymer additive | 7 g |

The additive comprises an acrylonitrile ethylacrylate-sodiumacrylate copolymer containing 22% units of sodium acrylate with an approximate molecular weight ($M_w$) of 20,000, as an aqueous solution with 50% dry extract. The viscosity of the suspension is 1,800 m.Pa.s.

After storage for one month at ambient temperature, no decantation of polymer particles is observed.

With the aid of this suspension, a 0.1% aqueous solution of the water soluble polymer containing 5 g/liter sodium chloride, is prepared. The polymer particles disperse easily without the formation of agglomerates.

The viscosity is 17.5 m.Pa.s.

A flow test was performed on this 0.1% solution under the following conditions:

| | |
|---|---|
| Temperature | 30° C. |
| Millipore MF 8 microns filters, diameter | 47 mm |
| Flow rate | 12 ml/h |
| Quantity injected | 1,000 ml |

The following results are obtained:

| | |
|---|---|
| $\Delta P_1$ | 27.5 mm water |
| $\Delta P_2$ | 10.5 mm water |

No change in the viscosity values is found after passage through the filters.

As a comparison, a 0.1% aqueous solution of a polymer prepared directly from the polymer powder yields the following flow test results under the same conditions:

| | |
|---|---|
| $\Delta P_1$ | 38 mm water |
| $\Delta P_2$ | 21 mm water |

EXAMPLE 2

Suspensions are prepared using as the water soluble polymer a copolymer of acrylic acid and acrylamide (Petrogil AD 37) with a molecular weight of $4.5 \times 10^6$ and the following particle size distribution:

| | |
|---|---|
| particles more than 500 μm | 35% |
| 500–200 μm | 30% |
| less than 200 μm | 35% |

The different compositions are recorded in Table 1 (quantities are expressed in parts by weight).

TABLE 1

| | COMPOSITION | | | | | | | |
|---|---|---|---|---|---|---|---|---|
| | 1 | 2 | 3 | 4 | 5 | 6 | 7 | 8 |
| Polyacrylamide | 42 | 36.4 | 31.5 | 35.5 | 35.5 | 35.5 | 38 | 24.2 |
| Diluent Isopropanol | 21 | 31.8 | 15.8 | 26.7 | 26.7 | 26.7 | 28.5 | 18.2 |
| Isobutanol Swelling Agent | | | 19.7 | | | | | |
| Water | 31.6 | 27.3 | 28.3 | | 31.1 | 31.1 | 19 | 48.5 |
| Glycerol | | | | 31.1 | | | | |
| Polymer Additive | | | | | | | | |
| A | 5.4 | 4.5 | 5.3 | 6.7 | | | 14.5 | 9.1 |
| B | | | | | 6.7 | | | |
| C | | | | | | 6.7 | | |

As the low molecular weight polymer additive, the following products are used:

A = the copolymer described in Example 1
B = acrylonitrile-sodium acrylate copolymer containing 37% by weight of sodium acrylate, $M_w$ = 40,000 as aqueous solution with 20% dry extract.
C = acrylonitrile-methyl acrylate-sodium acrylate copolymer with 7.2% by weight sodium acrylate, $M_w$ = 50,000 as aqueous solution with 25% dry extract.

All of the formulations produce good suspensions without gelling or sedimentation of the polymer after one month of storage at ambient temperatures and are readily dispersable in water.

EXAMPLE 3

A suspension containing a xanthan gum water soluble polymer marketed by Rhone-Poulenc Co. under the trademark of Rhodopol 23 ®, is prepared having the following particle size distribution:

| | |
|---|---|
| Particles more than 200 μm | 2% |
| 200–100 μm | 42% |
| less than 100 μm | 56% |

The suspension composition is as follows:

| | |
|---|---|
| Rhodopol 23 ® | 30.5 g |
| Isopropanol | 24.5 g |
| Water | 37.5 g |
| Polymer additive of Example 1 | 7.5 g |

The viscosity of the suspension is 2,300 m.Pa.s.

No sedimentation of particles is found after one month of storage at ambient temperatures.

Using the suspension of Example 3, a 0.1% aqueous solution containing 5 g/l NaCl, is prepared. The polymer particles are easily dispersed without forming agglomerates. The viscosity of the aqueous solution is 54.5 m.Pa.s. An aqueous solution of the same water soluble polymer reconstituted directly from the powder has a viscosity of 52 m.Pa.s.

The above described flow test is effected on a 0.04% dilute aqueous solution containing 5 g/liter sodium chloride (viscosity 10.5 m.Pa.s.), with 12 micron millipore filters, at a flow rate 12 ml/h. Quantity of the solution injection is 1,000 ml.

The following results are obtained:

| | |
|---|---|
| $\Delta P_1$ | 23 mm water |
| $\Delta P_2$ | 5 mm water |

The viscosity of the filtered solution is 10.5 m.Pa.s.

Under the same conditions, the $\Delta p$ of the solution prepared directly with a xanthan gum powder are 31 and 6.

EXAMPLE 4

With the xanthan gum of Example 3, different suspensions are prepared by varying the proportions of the components. The formulations are presented in Table 2 below:
Nature of the polymer additive:
A = the copolymer of Example 1
B = polyacrylic acid — $M_w$:20,000, aqueous solution with 43% dry extract
C = butyl acrylate-methyl methacrylate-ammonium methacrylate copolymer containing 14.2% by weight of ammonium methacrylate — $M_w$ = 50,000, aqueous solution with 20% dry extract.

TABLE 2

| | COMPOSITION | | | | | | |
|---|---|---|---|---|---|---|---|
| | 1 | 2 | 3 | 4 | 5 | 6 | 7 |
| Xanthan gum | 32 | 30.5 | 25 | 30.5 | 30.5 | 24.5 | 16.5 |
| Diluent | | | | | | | |
| Isopropanol | 20 | | | 24.5 | 24.5 | 20 | 13.5 |
| Benzylic alcohol | | 24.5 | | | | | |
| Cyclohexanol | | | 37.5 | | | | |
| Water | 40 | 37.5 | 31 | 37.5 | 37.5 | 49 | 66 |
| Polymer additive | | | | | | | |
| A | 8 | 7.5 | 6.5 | | | 6.5 | 4 |
| B | | | | 6.5 | | | |
| C | | | | | 6.5 | | |
| Viscosity in m.Pa.s. | | 10.000 | 2.200 | | | | |

All of these suspensions are stable after one month of storage at ambient temperatures. The xanthan gum is easily dispersed in water, with maximum viscosity being developed in 20 min.

While the invention has been described and illustrated with reference to certain preferred embodiments thereof, those skilled in the art will appreciate that various changes, modifications and substitutions can be made therein without departing from the spirit of the invention. It is intended, therefore, that the invention be limited only by the scope of the claims which follow.

What is claimed is:

1. A suspension of water soluble polymer comprising by weight 10 to 60% of a particulate high molecular weight water soluble polymer, 10 to 45% of a non-polymer solvating organic diluent, 10–75% of a swelling agent and 1 to 15% of a low molecular weight water soluble polymer having a molecular weight in the range of between about 2,000 an about 100,000 and having functional carboxylic groups thereon, said suspension being a concentrated suspension of said high molecular weight water soluble polymer.

2. A suspension according to claim 1, wherein the water soluble polymer is in particulate form and is selected from the group consisting of homopolymers and copolymers of polyacrylamides and polymethacrylamides.

3. A suspension according to claim 1, wherein the water soluble polymer is in particulate form and a natural gum or a modified natural gum.

4. A suspension according to claim 3, wherein the natural gum is a polysaccharide of microbial origin.

5. A suspension according to claim 4, wherein the polysaccharide is a xanthan gum.

6. A suspension according to claim 1, wherein the diluent is selected from the group consisting of aliphatic and aromatic hydrocarbons, halogenated hydrocarbons, lower aliphatic, cycloaliphatic and aromatic ketones and lower aliphatic, cycloaliphatic and aromatic alcohols.

7. A suspension according to claim 6, wherein the diluent is isopropanol or benzyl alcohol or mixtures thereof.

8. A suspension according to claim 1, wherein the swelling agent is water or a polar organic liquid miscible with water or mixtures thereof.

9. A suspension according to claim 8, wherein the polar organic liquid is selected from the group consisting of formamide, acetamide, dimethylformamide, ethylenediamine, ethyleneglycol, propylene glycol, glycerol and mixtures thereof.

10. A suspension according to claim 1, wherein the low molecular weight polymer is a homopolymer or copolymer resulting from the polymerization of at least one unsaturated $\alpha$, $\beta$-carboxylic acid of the formula $R_1$—CH=C($R_2$)—$R_3$, wherein $R_1$ is H, $CH_3$ or COOH, $R_2$ is H, a lower alkyl, halogen, COOH or $CH_2COOH$, $R_3$ is COOH, and the -COOH function or functions may be in the form of their water soluble salts.

11. A suspension according to claim 10, wherein the unsaturated carboxylic acid is selected from the group consisting of acrylic, methacrylic, crotonic, itaconic, maleic, fumaric and methylene malonic acids.

12. A suspension according to claim 10, wherein the low molecular weight polymer comprises a copolymer resulting from the polymerization of the $\alpha$, $\beta$-carboxylic acid with a comonomer selected from the group consisting of olefins, unsaturated esters and nitriles, vinyl ethers and vinyl esters.

13. A suspension according to claim 1, wherein the low molecular weight water soluble polymer is selected from acrylonitrile ethylacrylate-sodiumacrylate copolymer, acrylonitrile-sodium acrylate copolymer, acrylonitrile-methylacrylate-sodium acrylate copolymer, polyacrylic acid or butyl acrylate-methymethacrylate-ammonium methacrylate copolymer.

14. A suspension according to claim 1, wherein said suspension comprises a concentrated suspension of said high molecular weight water soluble polymer.

15. A suspension according to claim 1, further comprising a mineral or organic suspension aid insoluble in the diluent.

16. A process for preparing a suspension according to claim 1, comprising adding the water soluble polymer to a mixture of the diluent, swelling agent and the low molecular weight polymer.

17. An aqueous dispersion of a water soluble polymer comprising a suspension according to claim 1 diluted in an aqueous medium.

18. A method of recovering petroleum from underground deposits of same in oil-bearing fields, comprising introducing an aqueous dispersion of a water-soluble polymer according to claim 17 into said petroleum deposits to form a thickened resultant solution of polymer and petroleum and recovering said solutions.

* * * * *